(12) United States Patent
Jones et al.

(10) Patent No.: US 7,547,476 B2
(45) Date of Patent: *Jun. 16, 2009

(54) POLYMERIZABLE COMPOSITIONS COMPRISING NANOPARTICLES

(75) Inventors: Clinton L. Jones, Somerset, WI (US); David B. Olson, Marine on St. Croix, MN (US); Emily S. Goenner, Shoreview, MN (US); Brant U. Kolb, Afton, MN (US); John T. Brady, Lino Lakes, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/871,330

(22) Filed: Oct. 12, 2007

(65) Prior Publication Data

US 2008/0030829 A1 Feb. 7, 2008

Related U.S. Application Data

(63) Continuation of application No. 11/078,145, filed on Mar. 11, 2005, now Pat. No. 7,282,272, and a continuation-in-part of application No. 10/939,184, filed on Sep. 10, 2004, now Pat. No. 7,179,513, and a continuation-in-part of application No. 10/938,006, filed on Sep. 10, 2004, now Pat. No. 7,289,202, and a continuation-in-part of application No. 10/870,366, filed on Jun. 17, 2004, now abandoned, which is a continuation-in-part of application No. 10/662,085, filed on Sep. 12, 2003, now Pat. No. 7,074,463.

(51) Int. Cl.
  B32B 9/04     (2006.01)
  B32B 27/00    (2006.01)
  G02B 5/00     (2006.01)
  C08F 20/10    (2006.01)
  C08L 31/00    (2006.01)

(52) U.S. Cl. .................. 428/500; 428/411.1; 428/688; 428/913; 977/773; 977/778; 977/840; 977/932; 977/939; 522/179; 524/558; 524/559; 526/318.43; 526/321

(58) Field of Classification Search .............. 428/411.1, 428/500, 688, 913; 977/773, 778, 840, 932, 977/939; 522/179; 524/409, 413, 430, 437, 524/497, 558, 559; 526/318.43, 321
See application file for complete search history.

(56) References Cited

U.S. PATENT DOCUMENTS

| | | | |
|---|---|---|---|
| 4,487,904 A | 12/1984 | Fukuda et al. |
| 4,542,449 A | 9/1985 | Whitehead |
| 4,568,445 A | 2/1986 | Cates et al. |
| 4,721,377 A | 1/1988 | Fukuda et al. |
| 4,812,032 A | 3/1989 | Fukuda et al. |
| 4,931,523 A | 6/1990 | Watanabe et al. |
| 4,937,172 A | 6/1990 | Gervay |
| 4,962,163 A | 10/1990 | Hefner, Jr. et al. |
| 4,970,135 A | 11/1990 | Kushi et al. |
| 5,066,750 A | 11/1991 | Hefner, Jr. et al. |
| 5,073,462 A | 12/1991 | Gervay |
| 5,149,776 A | 9/1992 | Kushi et al. |
| 5,164,464 A | 11/1992 | Hefner, Jr. et al. |
| 5,175,030 A | 12/1992 | Lu et al. |
| 5,183,597 A | 2/1993 | Lu |
| 5,183,870 A | 2/1993 | Fukushima et al. |
| 5,247,038 A | 9/1993 | Fukushima et al. |
| 5,354,821 A | 10/1994 | Huver et al. |
| 5,424,339 A | 6/1995 | Zanka et al. |
| 5,486,949 A | 1/1996 | Schrenk et al. |
| 5,612,820 A | 3/1997 | Schrenk et al. |
| 5,626,800 A | 5/1997 | Williams et al. |
| 5,635,278 A | 6/1997 | Williams |
| 5,665,494 A | 9/1997 | Kawabata et al. |
| 5,691,846 A | 11/1997 | Benson, Jr. et al. |
| 5,714,218 A | 2/1998 | Nishio et al. |
| 5,760,126 A | 6/1998 | Engle et al. |
| 5,771,328 A | 6/1998 | Wortman et al. |
| 5,783,120 A | 7/1998 | Ouderkirk et al. |
| 5,825,543 A | 10/1998 | Ouderkirk et al. |
| 5,828,488 A | 10/1998 | Ouderkirk et al. |
| 5,855,983 A | 1/1999 | Williams |
| 5,882,774 A | 3/1999 | Jonza et al. |
| 5,898,523 A | 4/1999 | Smith et al. |
| 5,900,287 A | 5/1999 | Williams |
| 5,908,874 A | 6/1999 | Fong et al. |
| 5,917,664 A | 6/1999 | O'Neil et al. |
| 5,919,551 A | 7/1999 | Cobb, Jr. et al. |
| 5,932,626 A | 8/1999 | Fong et al. |
| 5,948,514 A | 9/1999 | Komori et al. |
| 6,107,364 A | 8/2000 | Fong et al. |
| 6,111,696 A | 8/2000 | Allen et al. |
| 6,218,074 B1 | 4/2001 | Dueber et al. |
| 6,225,244 B1 | 5/2001 | Oguma |
| 6,261,700 B1 | 7/2001 | Olson et al. |
| 6,280,063 B1 | 8/2001 | Fong et al. |
| 6,291,070 B1 | 9/2001 | Arpac et al. |
| 6,329,058 B1 | 12/2001 | Arney et al. |
| 6,355,754 B1 | 3/2002 | Olson et al. |
| 6,356,391 B1 | 3/2002 | Gardiner et al. |

(Continued)

FOREIGN PATENT DOCUMENTS

EP    0 089 041    11/1987

(Continued)

OTHER PUBLICATIONS

WG-320 Analysis by Jones et al., May 31, 2005.

Primary Examiner—Shean C Wu
(74) Attorney, Agent, or Firm—Carolyn A. Fischer

(57) ABSTRACT

Polymerizable compositions comprising nanopartilces particularly useful for brightness enhancing films.

33 Claims, 2 Drawing Sheets

U.S. PATENT DOCUMENTS

| | | |
|---|---|---|
| 6,359,170 B1 | 3/2002 | Olson |
| 6,368,682 B1 | 4/2002 | Fong |
| 6,376,590 B2 | 4/2002 | Kolb et al. |
| 6,432,526 B1 | 8/2002 | Arney et al. |
| 6,514,842 B1 | 2/2003 | Prall et al. |
| 6,521,677 B2 | 2/2003 | Yashiro et al. |
| 6,541,591 B2 | 4/2003 | Olson et al. |
| 6,593,392 B2 | 7/2003 | Wang |
| 6,599,631 B2 | 7/2003 | Kambe et al. |
| 6,645,569 B2 | 11/2003 | Cramer et al. |
| 6,656,990 B2 | 12/2003 | Shustack et al. |
| 6,727,309 B1 | 4/2004 | Paiva et al. |
| 6,844,047 B2 | 1/2005 | Kaminsky et al. |
| 6,844,950 B2 | 1/2005 | Ja Chisholm et al. |
| 6,846,089 B2 | 1/2005 | Stevenson et al. |
| 7,041,365 B2 | 5/2006 | Kausch et al. |
| 7,046,439 B2 | 5/2006 | Kaminsky et al. |
| 7,074,463 B2 | 7/2006 | Jones et al. |
| 7,282,272 B2 | 10/2007 | Jones et al. |
| 7,427,438 B2 * | 9/2008 | Jones et al. ............... 428/331 |
| 2002/0057497 A1 | 5/2002 | Gardiner et al. |
| 2003/0021566 A1 | 1/2003 | Shustack et al. |
| 2003/0050358 A1 | 3/2003 | Wang |
| 2003/0100693 A1 | 5/2003 | Olson et al. |
| 2003/0129385 A1 | 7/2003 | Hojo et al. |
| 2003/0165680 A1 | 9/2003 | Brady et al. |
| 2003/0175004 A1 | 9/2003 | Garito et al. |
| 2003/0180029 A1 | 9/2003 | Garito et al. |
| 2003/0186066 A1 | 10/2003 | Monkiewicz et al. |
| 2004/0132858 A1 | 7/2004 | Chisholm et al. |
| 2004/0233526 A1 | 11/2004 | Kaminsky et al. |
| 2005/0059766 A1 | 3/2005 | Jones et al. |
| 2005/0063898 A1 | 3/2005 | Ja Chisholm |
| 2005/0136252 A1 | 6/2005 | Chisholm et al. |
| 2005/0147838 A1 | 7/2005 | Olson et al. |
| 2005/0151119 A1 | 7/2005 | Jones et al. |
| 2006/0004166 A1 | 1/2006 | Olson et al. |
| 2007/0112097 A1 | 5/2007 | Olson et al. |
| 2008/0030829 A1 | 2/2008 | Jones et al. |

FOREIGN PATENT DOCUMENTS

| | | |
|---|---|---|
| EP | 0 768 351 | 4/1997 |
| EP | 1 014 113 | 6/2000 |
| EP | 1 388 581 | 2/2004 |
| JP | 11-223703 | 8/1999 |
| JP | 2000-147208 | 5/2000 |
| JP | 2003-342338 | 12/2003 |
| JP | 2005-316219 | 11/2005 |
| WO | WO 96/19347 | 6/1996 |
| WO | WO 98/50441 | 11/1998 |
| WO | WO 98/50442 | 11/1998 |
| WO | WO 98/50805 | 11/1998 |
| WO | WO 98/50806 | 11/1998 |
| WO | WO 98/90340 | 11/1998 |
| WO | WO 00/06495 | 2/2000 |
| WO | WO 00/14050 | 3/2000 |
| WO | WO 01/29138 | 4/2001 |
| WO | WO 01/51539 | 7/2001 |
| WO | WO 02/00594 | 1/2002 |
| WO | WO 02/45129 | 6/2002 |
| WO | WO 02/051892 | 7/2002 |
| WO | WO 03/033558 | 4/2003 |
| WO | WO 03/041875 | 5/2003 |
| WO | WO 03/076528 | 9/2003 |
| WO | WO 2004/042434 | 5/2004 |
| WO | WO 2004/108839 | 12/2004 |

* cited by examiner

POLYMERIZABLE COMPOSITIONS COMPRISING NANOPARTICLES

RELATED APPLICATIONS

This application is a continuation of U.S. patent application Ser. No. 11/078,145, filed Mar. 11, 2005, issued as U.S. Pat. No. 7,282,272, which is a continuation-in-part of U.S. patent application Ser. No. 10/662,085 filed Sep. 12, 2003 issued as U.S. Pat. No. 7,074,463; a continuation-in-part of U.S. patent application Ser. No. 10/870,366 filed Jun. 17, 2004, abandoned; a continuation-in-part of U.S. patent application Ser. No. 10/939,184, filed Sep. 10, 2004 issued as U.S. Pat. No. 7,179,513; and a continuation-in-part of U.S. patent application Ser. No. 10/938,006, filed Sep. 10, 2004 issued as U.S. Pat. No 7,289,202.

BACKGROUND

Certain microreplicated optical products, such as described in U.S. Pat. Nos. 5,175,030 and 5,183,597, are commonly referred to as a "brightness enhancing films". Brightness enhancing films are utilized in many electronic products to increase the brightness of a backlit flat panel display such as a liquid crystal display (LCD) including those used in electroluminescent panels, laptop computer displays, word processors, desktop monitors, televisions, video cameras, as well as automotive and aviation displays.

Brightness enhancing films desirably exhibit specific optical and physical properties including the index of refraction of a brightness enhancing film that is related to the brightness gain (i.e. "gain") produced. Improved brightness can allow the electronic product to operate more efficiently by using less power to light the display, thereby reducing the power consumption, placing a lower heat load on its components, and extending the lifetime of the product.

Brightness enhancing films have been prepared from high index of refraction monomers that are cured or polymerized, as described for example in U.S. Pat. Nos. 5,908,874; 5,932,626; 6,107,364; 6,280,063; 6,355,754; as well as EP 1 014113 and WO 03/076528.

Although various polymerizable compositions that are suitable for the manufacture of brightness enhancing films are known, industry would find advantage in alternative compositions.

SUMMARY

In one embodiment, a brightness enhancing film having a brightness enhancing polymerized structure is described that comprises the reaction product of a polymerizable composition comprising at least about 15 wt-% of one or more first monomers selected from i) a monomer comprising a major portion having the structure

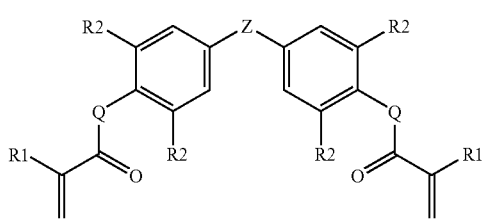

(I)

wherein R1 is independently hydrogen or methyl,
R2 is independently H or Br,
Z is independently —C(CH$_3$)$_2$—, —CH$_2$—, —C(O)—, —S—, —S(O)—, or —S(O)$_2$—, and
Q is independently O or S;

ii) a monomer comprising a major portion having the structure

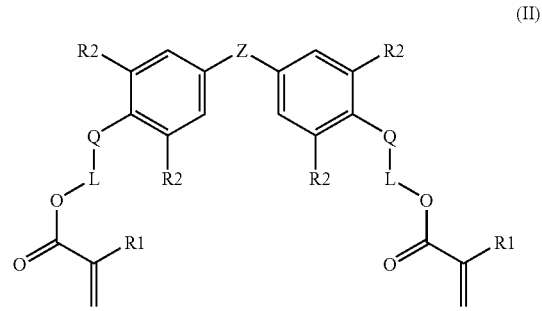

(II)

wherein R1 is independently hydrogen or methyl,
R2 is independently H or Br,
Z is independently —C(CH$_3$)$_2$—, —CH$_2$—, —C(O)—, —S—, —S(O)—, or —S(O)$_2$—, and
L is a linking group independently selected from linear and branched C$_2$-C$_{12}$ alkyl groups wherein the carbon chain is optionally substituted with one or more oxygen group and/or the carbon atoms are optionally substituted with one or more hydroxyl groups;

and mixtures of i) and ii);

b) at least about 10 wt-% inorganic nanoparticles; and c) optionally a crosslinking agent comprising at least three (meth)acrylate functional groups.

In another embodiment, a brightness enhancing film having a brightness enhancing polymerized structure is described that comprises the reaction product of a polymerizable composition comprising a) at least about 15 wt-% of one or more (meth)acrylated aromatic epoxy oligomers;

b) at least about 10 wt-% inorganic nanoparticles; and c) optionally a crosslinking agent comprising at least three (meth)acrylate functional groups.

In another embodiment, a brightness enhancing film having a brightness enhancing polymerized structure is described that comprises the reaction product of a substantially solvent free polymerizable composition comprising an organic component, comprising one or more ethylenically unsaturated monomers, and at least 10 wt-% inorganic nanoparticles. The organic component has a viscosity of less than 1000 cps at 180° F. The organic component may comprise at least one oligomeric ethylenically unsaturated monomer having a number average molecular weight of greater than 450 g/mole.

In yet another embodiment, a brightness enhancing film having a brightness enhancing polymerized structure is described that comprises the reaction product of a substantially solvent free polymerizable composition comprising an organic component comprising one or more ethylenically unsaturated monomers wherein the organic component has a refractive index of at least 1.54; and at least 10 wt-% inorganic nanoparticles.

The amount of inorganic particles is typically less than about 60 wt-%. The inorganic nanoparticles are preferably surface modified. The inorganic nanoparticles typically comprise silica, zirconia, titania, antimony oxides, alumina, tin oxides, mixed metal oxides thereof, and mixtures thereof. The nanoparticles may range in primary particle size from 5 nm to 75 nm, from 10 nm to 30 nm, from 5 nm to 15 nm.

The first monomer preferably consists of the reaction product of Tetrabromobisphenol A diglycidyl ether and (meth) acrylic acid. The polymerizable compositions may further comprise at least one second high index monomer (i.e. different than the first monomer). The polymerizable composition is preferably free of methacrylate functional monomer.

In other embodiments, the invention relates to an article comprising the brightness enhancing film in contact with a second optical film or light guide. The second optical film may include a turning film, a diffuser, an absorbing polarizer, a reflective polarizer, or a protective cover film.

The polymerizable compositions described herein may also be advantageous for other optical or microstructured articles.

DETAILED DESCRIPTION

Figure 1:
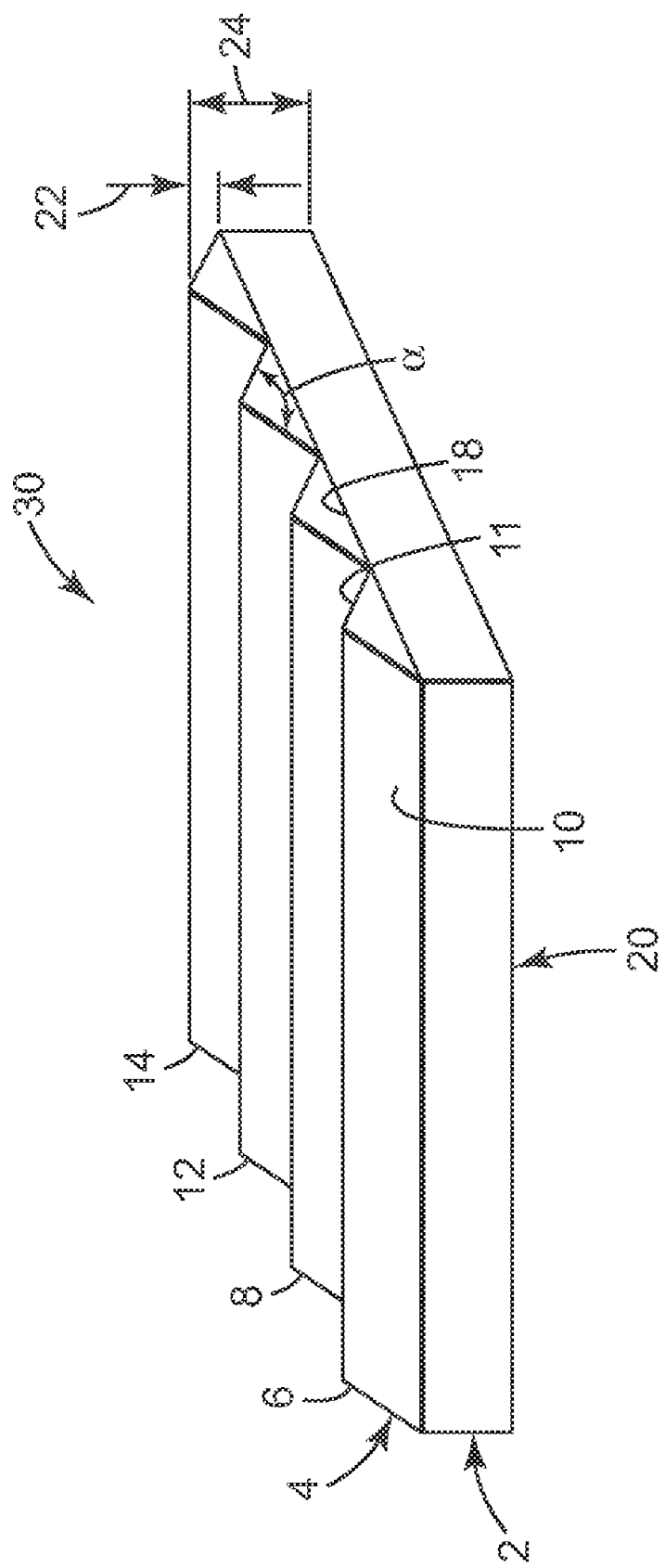
FIG. 1 is a perspective view of an illustrative microstructure-bearing optical product of the present invention.

As used within the present description:

"Index of refraction," or "refractive index," refers to the absolute refractive index of a material (e.g., a monomer) that is understood to be the ratio of the speed of electromagnetic radiation in free space to the speed of the radiation in that material. The refractive index can be measured using known methods and is generally measured using an Abbe refractometer in the visible light region (available commercially, for example, from Fisher Instruments of Pittsburgh, Pa.). It is generally appreciated that the measured index of refraction can vary to some extent depending on the instrument.

"(Meth)acrylate" refers to both acrylate and methacrylate compounds.

"Polymerizable composition" refers to the total composition including the organic component that comprises at least one polymerizable monomer and the optional inorganic nanoparticles.

"Organic component" refers to all of the components of the composition except for the inorganic nanoparticles. For embodiments wherein the polymerizable composition is free of inorganic nanoparticles, the organic component and polymerizable composition are one in the same.

The term "nanoparticles" is defined herein to mean particles (primary particles or associated primary particles) with a diameter less than about 100 nm.

"Surface modified colloidal nanoparticle" refers to nanoparticles each with a modified surface such that the nanoparticles provide a stable dispersion.

"Aggregation" refers to a strong association between primary particles that may be chemically bound to one another. The breakdown of aggregates into smaller particles is difficult to achieve.

"Agglomeration refers to a weak association between primary particles which my be held together by charge or polarity and can be broken down into smaller entities.

"Primary particle size" refers to the mean diameter of a single (non-aggregate, non-agglomerate) particle.

Brightness enhancing films generally enhance on-axis luminance (referred herein as "brightness") of a lighting device. Brightness enhancing films can be light transmissible, microstructured films. The microstructured topography can be a plurality of prisms on the film surface such that the films can be used to redirect light through reflection and refraction. The height of the prisms typically ranges from about 1 to about 75 microns. When used in an optical display such as that found in laptop computers, watches, etc., the microstructured optical film can increase brightness of an optical display by limiting light escaping from the display to within a pair of planes disposed at desired angles from a normal axis running through the optical display. As a result, light that would exit the display outside of the allowable range is reflected back into the display where a portion of it can be "recycled" and returned back to the microstructured film at an angle that allows it to escape from the display. The recycling is useful because it can reduce power consumption needed to provide a display with a desired level of brightness.

Brightness enhancing films include microstructure-bearing articles having a regular repeating pattern of symmetrical tips and grooves. Other examples of groove patterns include patterns in which the tips and grooves are not symmetrical and in which the size, orientation, or distance between the tips and grooves is not uniform. Examples of brightness enhancing films are described in Lu et al., U.S. Pat. No. 5,175,030, and Lu, U.S. Pat. No. 5,183,597, incorporated herein by reference.

Referring to FIG. 1, a brightness enhancing film 30 may comprise a base layer 2 and optical layer 4. Optical layer 4 comprises a linear array of regular right prisms, identified as prisms 6, 8, 12, and 14. Each prism, for example, prism 6, has a first facet 10 and a second facet 11. The prisms 6, 8, 12, and 14 are formed on base 2 that has a first surface 18 on which the prisms are formed and a second surface 20 that is substantially flat or planar and opposite first surface 18. By right prisms it is meant that the apex angle α is typically about 90°. However, this angle can range from 70° to 120° and may range from 80° to 100°. Further the apexes can be sharp, rounded, flattened or truncated. The prism facets need not be identical, and the prisms may be tilted with respect to each other. The relationship between the total thickness 24 of the optical article, and the height 22 of the prisms, may vary. However, it is typically desirable to use relatively thinner optical layers with well-defined prism facets. A typical ratio of prism height 22 to total thickness 24 is generally between 25/125 and 2/125.

The base layer of the brightness enhancing film can be of a nature and composition suitable for use in an optical product, i.e. a product designed to control the flow of light. Many materials can be used as a base material provided the material is sufficiently optically clear and is structurally strong enough to be assembled into or used within a particular optical product. Preferably, the base material is chosen that has sufficient resistance to temperature and aging that performance of the optical product is not compromised over time.

The particular chemical composition and thickness of the base material for any optical product can depend on the requirements of the particular optical product that is being constructed. That is, balancing the needs for strength, clarity, temperature resistance, surface energy, adherence to the optical layer, among others. The thickness of the base layer is typically at least about 0.025 millimeters (mm) and more typically at least about 0.25 mm. Further, the base layer generally has a thickness of no more than about 1 mm.

Useful base layer materials include cellulose acetate butyrate, cellulose acetate propionate, cellulose triacetate, polyether sulfone, polymethyl methacrylate, polyurethane, polyester, polycarbonate, polyvinyl chloride, syndiotactic polystyrene, polyethylene naphthalate, copolymers or blends based on naphthalene dicarboxylic acids, and glass. Optionally, the base material can contain mixtures or combinations of these materials. For example, the base may be multi-layered or may contain a dispersed phase suspended or dispersed in a continuous phase. Exemplary base layer materials include polyethylene terephthalate (PET) and polycarbonate. Examples of useful PET films include photograde polyethylene terephthalate (PET) and PET commercially available from DuPont Films of Wilmington, Del., under the trade designation "Melinex".

The base layer material can be optically active, and can act as a polarizing material. A number of base layer materials are known to be useful as polarizing materials. Polarization of light through a film can be accomplished, for example, by the inclusion of dichroic polarizers in a film material that selectively absorbs passing light. Light polarization can also be achieved by including inorganic materials such as aligned mica chips or by a discontinuous phase dispersed within a continuous film, such as droplets of light modulating liquid crystals dispersed within a continuous film. As an alternative, a film can be prepared from microfine layers of different materials. The polarizing materials within the film can be aligned into a polarizing orientation, for example, by employing methods such as stretching the film, applying electric or magnetic fields, and coating techniques.

Examples of polarizing films include those described in U.S. Pat. Nos. 5,825,543 and 5,783,120, each incorporated herein by reference. The use of these polarizer films in combination with a brightness enhancement film has been described in U.S. Pat. No. 6,111,696; incorporated herein by reference. Another example of a polarizing film is described in U.S. Pat. No. 5,882,774; incorporated herein by reference. Multilayer polarizing films are sold by 3M Company, St. Paul, Minn. under the trade designation DBEF (Dual Brightness Enhancement Film). The use of such multilayer polarizing optical film in a brightness enhancement film has been described in U.S. Pat. No. 5,828,488; incorporated herein by reference.

Other polarizing and non-polarizing films can also be useful as the base layer for brightness enhancing films of the invention such as described in U.S. Pat. Nos. 5,612,820 and 5,486,949, among others.

The present invention relates to polymerizable resin compositions useful for optical articles and in particular the optical layer of a brightness enhancing film. The brightness enhancing or other microstructured articles comprise a polymerized structure comprising the reaction product of an organic component optionally comprising a plurality of nanoparticles. The polymerized structure can be an optical element or optical product constructed of a base layer and an optical layer. The base layer and optical layer can be formed from the same or different polymer material.

The polymerizable resin composition comprises a first monomer having a refractive index of at least 1.47, for most product applications; whereas the polymerizable resin composition of a turning film may have a refractive index as low as 1.44. High transmittance in the visible light spectrum is also typically preferred. The composition of the invention is preferably polymerizable by irradiation with ultraviolet or visible light in the presence of a photoinitiator.

In one embodiment, the invention relates to a polymerizable composition comprising a first monomer that comprises a major portion having the following general structures I or II:

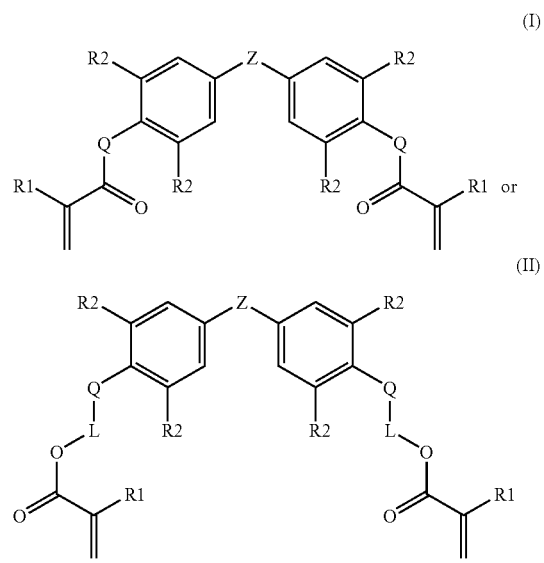

In each of structures I and II, each R1 is independently hydrogen or methyl. Each R2 is independently hydrogen or bromine. Each Z is independently —C(CH$_3$)$_2$—, —CH$_2$—, —C(O)—, —S—, —S(O)—, or —S(O)$_2$—, and each Q is independently O or S. Typically, the R1 groups are the same. Typically, the R2 groups are the same as each other well. In structure II, L is a linking group. L may independently comprise a branched or linear C$_2$-C$_{12}$ alkyl group. The carbon chain of the alkyl group may optionally be substituted with one or more oxygen groups. Further, the carbon atoms of the alkyl group may optionally be substituted with one or more hydroxyl groups. For example L may be —CH$_2$CH(OH)CH$_2$—. Typically, the linking groups are the same. Preferably the alkyl group comprises no more than 8 carbon atoms and more preferably no more than 6 carbon atoms.

Mixtures of I and II may also be employed.

The first monomer may be synthesized or purchased. As used herein, major portion refers to at least 60-70 wt-% of the monomer containing the specific structure(s) just described. It is commonly appreciated that other reaction products are also typically present as a byproduct of the synthesis of such monomers.

The first monomer is preferably the reaction product of Tetrabromobisphenol A diglycidyl ether and acrylic acid. The first monomer may be obtained from UCB Corporation, Smyrna, Ga. under the trade designation "RDX-51027". This material comprises a major portion of 2-propenoic acid, (1-methylethylidene)bis[(2,6-dibromo-4,1-phenylene)oxy (2-hydroxy-3,1-propanediyl)]ester.

Although, mixtures of such first monomers may also suitably be employed, for ease in manufacturing it is preferred to employ as few different monomers as possible, yet still attain a brightness enhancing film with suitable gain. To meet this end, it is preferred that the brightness enhancing film is comprised of the reaction product of only one of these first monomers and in particular the reaction product of Tetrabromobisphenol A diglycidyl ether and acrylic acid.

In another embodiment, the polymerizable composition comprises at least one (meth)acrylated aromatic epoxy oligomer. Various (meth)acrylated aromatic epoxy oligomers are available commercially available. For example, (meth)acrylated aromatic epoxy, (described as a modified epoxy acrylates), are available from Sartomer, Exton, Pa. under the trade designation "CN118", "CN115" and "CN112C60". An (meth)acrylated aromatic epoxy oligomer, (described as an epoxy acrylate oligomer), is available from Sartomer under the trade designation "CN2204". Further, an (meth)acrylated aromatic epoxy oligomer, (described as an epoxy novolak acrylate blended with 40% trimethylolpropane triacrylate), is available from Sartomer under the trade designation "CN112C60".

In some embodiments, the aromatic epoxy acrylate is derived from bisphenol A, such as those of II. In other embodiments, however, the aromatic epoxy acrylate may be derived from a monomer different than bisphenol A. The organic component may comprise aromatic epoxy acrylate, at least one crosslinking agent, at least one reactive diluent, and at least one other ethylenically unsaturated monomer. Alternatively, the organic component of the polymerizable composition may only include the aromatic epoxy acrylate and crosslinking agent or the aromatic epoxy acrylate and reactive diluent, each of such including photoinitiator. If an aromatic epoxy acrylate is employed the polymerizable composition, the aromatic epoxy acrylate may be monofunctional provided that the polymerizable composition includes at least one ingredient that comprises at least two ethylenically unsaturated polymerizable groups. The aromatic epoxy acrylate may have three or more (meth)acrylate groups. The aromatic epoxy (meth)acrylate may be halogenated, typically having a refractive index of greater than 1.56. In other aspects, the aromatic epoxy (meth)acrylate may have a refractive index of less than 1.56. The aromatic epoxy (meth)acrylate may have a viscosity of greater than 2150 cps at 65° C. Less than 30 wt-% of the aromatic epoxy (meth)acrylate may be employed, for example in combination with a reactive diluent. In other embodiments, the aromatic epoxy (meth)acrylate may have a viscosity of less than 2150 cps at 65° C., and diluent may not be employed. Greater than 30 wt-% of the aromatic epoxy (meth)acrylate may be employed in organic component.

The first monomer and/or aromatic epoxy (meth)acrylate is preferably present in the polymerizable composition in an amount of at least about 15 wt-% (e.g. 20 wt-%, 30 wt-%, 35 wt-%, 40 wt-%, 45 wt-% and 50 wt-% and any amount there between). Typically, the amount of the first monomer and/or aromatic epoxy (meth)acrylate does not exceed about 60 wt-%.

In addition to the first monomer and/or aromatic epoxy (meth)acrylate, the polymerizable composition of the invention can optionally include at least one and preferably only one crosslinking agent. Multi-functional monomers can be used as crosslinking agents to increase the glass transition temperature of the polymer that results from the polymerizing of the polymerizable composition. The glass transition temperature can be measured by methods known in the art, such as Differential Scanning Calorimetry (DSC), modulated DSC, or Dynamic Mechanical Analysis. Preferably, the polymeric composition is sufficiently crosslinked to provide a glass transition temperature that is greater than 45° C.

The crosslinking agent comprises at least two (meth)acrylate functional groups. Since methacrylate groups tend to be less reactive than acrylate groups, it is preferred that the crosslinking agent comprises three or more acrylate groups. Suitable crosslinking agents include for example hexanediol acrylate (HDDA), pentaerythritol tri(meth)acrylate, pentaerythritol tetra(meth)acrylate, trimethylolpropane tri(meth)acrylate), dipentaerythritol penta(meth)acrylate, dipentaerythritol hexa(meth)acrylate, trimethylolpropane ethoxylate tri(meth)acrylate, glyceryl tri(meth)acrylate, pentaerythritol propoxylate tri(meth)acrylate, and ditrimethylolpropane tetra(meth)acrylate. Any one or combination of crosslinking agents may be employed.

The crosslinking agent is preferably present in the polymerizable composition in an amount of at least about 2 wt-%. Typically, the amount of crosslinking agent is not greater than about 25 wt-%. The crosslinking agent may be present in any amount ranging from about 5 wt-% and about 15 wt-%.

Preferred crosslinking agents include hexanediol diacrylate (HDDA), pentaerythritol tri(meth)acrylate, pentaerythritol tetra(meth)acrylate, dipentaerythritol penta(meth)acrylate, trimethylolpropane tri(meth)acrylate, ditrimethylolpropane tetra(meth)acrylate, and mixtures thereof. More preferably the crosslinking agent(s) is free of methacrylate functionality. Pentaerythritol triacrylate (PETA) and dipentaerythritol pentaacrylate are commercially available from Sartomer Company, Exton, Pa. under the trade designations "SR444" and "SR399LV" respectively; from Osaka Organic Chemical Industry, Ltd. Osaka, Japan under the trade designation "Viscoat #300"; from Toagosei Co. Ltd., Tokyo, Japan under the trade designation "Aronix M-305"; and from Eternal Chemical Co., Ltd., Kaohsiung, Taiwan under the trade designation "Etermer 235". Trimethylol propane triacrylate (TMPTA) and ditrimethylol propane tetraacrylate (di-TMPTA) are commercially available from Sartomer Company under the trade designations "SR351" and "SR355". TMPTA is also available from Toagosei Co. Ltd. under the trade designation "Aronix M-309". Further, ethoxylated trimethylolpropane triacrylate and ethoxylated pentaerythritol triacrylate are commercially available from Sartomer under the trade designations "SR454" and "SR494" respectively.

For embodiments wherein surface modified nanoparticles having sufficient polymerizable reactive groups are employed, a crosslinking agent need not be employed. For example, 10 wt-% phenoxy ethyl acrylate can be combined with the first monomer and at least 10 wt-% of the surface modified nanoparticles (e.g. of Example 1).

The (e.g. first, aromatic epoxy (meth)acrylate) monomer(s) as well as optional crosslinking agent and optional reactive diluent typically comprise (meth)acrylate functional groups. In preferred embodiments the polymerizable composition comprises solely acrylate functionality and thus is substantially free of methacrylate functional groups.

The polymerizable composition described herein contains (e.g. surface modified) inorganic oxide particles. The size of such particles is chosen to avoid significant visible light scattering. It may be desirable employ a mixture of inorganic oxide particle types to optimize an optical or material property and to lower total composition cost. Hybrid polymers formed from inorganic nanoparticles and organic resin is amenable to achieving durability unobtainable with conventional organic resins alone. The inclusion of the inorganic nanoparticles can improve the durability of the articles (e.g. brightness enhancing film) thus formed.

The polymerizable compositions just described are preferred compositions for providing a substantially solvent free polymerizable composition comprising inorganic nanoparticles and an organic component, wherein the organic component has a low viscosity, such as less than 1000 cps at 180° F.

"Substantially solvent free" refer to the polymerizable composition having less than 5 wt-%, 4 wt-%, 3 wt-%, 2 wt-%, 1 wt-%, and 0.5 wt-% of (e.g. organic) solvent. The concentration of solvent can be determined by known methods, such as gas chromatography. Solvent concentrations of less than 0.5 wt-% are preferred.

The organic component can be a solid or comprise a solid component provided that the melting point in the polymerizable composition is less than the coating temperature. The organic component can be a liquid at ambient temperature.

The components of the organic component are preferably chosen such that the organic component has a low viscosity. Typically the viscosity of the organic component is substantially lower than the organic component of compositions previously employed. The viscosity of the organic component is less than 1000 cps and typically less than 900 cps. The viscosity of the organic component may be less than 800 cps, less than 450 cps, less than 600 cps, or less than 500 cps at the coating temperature. As used herein, viscosity is measured with 25 mm parallel plates using a Dynamic Stress Rheometer (at a shear rate up to 1000 $sec^{-1}$). Further, the viscosity of the organic component is typically at least 10 cps, more typically at least 50 cps, even more typically at least 100 cps, and most typically at least 200 cps at the coating temperature.

The coating temperature typically ranges from ambient temperature, (i.e. 25° C.) to 180° F. (82° C.). The coating temperature may be less than 170° F. (77° C.), less than 160° F. (71° C.), less than 150° F. (66° C.), less than 140° F. (60° C.), less than 130° F. (54° C.), or less than 120° F. (49° C.). The organic component can be a solid or comprise a solid component provided that the melting point is less than the coating temperature. The organic component can be a liquid at ambient temperature.

The organic component as well as the polymerizable composition has a refractive index of at least 1.47, for most product applications; whereas the polymerizable resin composition of a turning film may have a refractive index as low as 1.44. The refractive index of the organic component or the polymerizable composition may be at least 1.48, 1.49, 1.50, 1.51, 1.52, 1.53, 1.54, 1.55, 1.56, 1.57, 1.58, 1.59, or 1.60. The polymerizable composition including the nanoparticles can have a refractive index as high as 1.70. (e.g. at least 1.61, 1.62, 1.63, 164, 1.65, 1.66, 1.67, 1.68, or 1.69) High transmittance in the visible light spectrum is also typically preferred.

Accordingly, the polymerizable compositions just described are also preferred compositions for providing a substantially solvent free polymerizable composition comprising nanoparticles and an organic component comprising one or more ethylenically unsaturated monomers wherein the organic component has a high refractive index, i.e. of at least 1.54.

The polymerizable composition having the low viscosity and/or high refractive index organic component may be prepared from other ethylenically unsaturated monomers as well. The organic component may comprise a (meth)acrylated urethane oligomer, (meth)acrylated polyester oligomer, a (meth)acrylated phenolic oligomer, a (meth)acrylated acrylic oligomer, and mixtures thereof. In some embodiments, however, the organic component is free of urethane linkages.

The organic component may comprise at least one oligomeric ethylenically unsaturated monomer having a number average molecular weight of greater than 450 g/mole, typically in combination with a reactive diluent and/or crossliker.

Suitable oligomeric (meth)acrylated aromatic epoxy oligomers are commercially available from Sartomer under the trade designations "CN104", "CN116", "CN120", CN121" and "CN136"; from Cognis under the trade designation "Photomer 3016"; and from UCB under the trade designations "3200", "3201", "3211" and "3212".

Suitable urethane (meth)acrylates are commercially available from Sartomer under the trade designations "CN965", "CN968", "CN981", "CN983", "CN984", "CN972", and "CN978"; from Cognis under the trade designation "Photomer 6210", "Photomer 6217", "Photomer 6230", "Photomer 6623", "Photomer 6891", and "Photomer 6892"; and from UCB under the trade designations "Ebecryl 1290", "Ebecryl 2001", and "Ebecryl 4842".

Suitable polyester (meth)acrylates are commercially available from Sartomer under the trade designation "CN292"; from Cognis under the trade designation "Photomer 5010", "Photomer 5429", "Photomer 5430", "Photomer 5432", "Photomer 5662", "Photomer 5806", and "Photomer 5920"; and from UCB under the trade designations "Ebecryl 80", "Ebecryl 81", "Ebecryl 83", "Ebecryl 450", "Ebecryl 524", "Ebecryl 525", "Ebecryl 585", "Ebecryl 588", "Ebecryl 810", and "Ebecryl 2047".

Suitable phenolic (meth)acrylates are commercially available from Sartomer under the trade designation "SR601" and "SR602"; from Cognis under the trade designations "Photomer 4025" and "Photomer 4028".

Suitable (meth)acrylated acrylic oligomers are also commercially available or can be prepared by methods know in the art.

In each embodiment described herein, the polymerizable resin composition optionally, yet preferably comprises up to about 35 wt-% (e.g. integers ranging from 1 to 35) reactive diluents to reduce the viscosity of the polymerizable resin composition and to improve the processability. Reactive diluents are mono-ethylenically unsaturated monomers such as (meth)acrylates or monomeric N-substituted or N,N-disubstituted (meth)acrylamides, especially an acrylamide. These include N-alkylacrylamides and N,N-dialkylacrylamides, especially those containing $C_{1-4}$ alkyl groups. Examples are N-isopropylacrylamide, N-t-butylacrylamide, N,N-dimethylacrylamide, N,N-diethylacrylamide, N-vinyl pyrrolidone and N-vinyl caprolactam.

Preferred diluents can have a refractive index greater than 1.50 (e.g. greater than 1.55. Such reactive diluents can be halogenated or non-halogenated (e.g. non-brominated). Suitable monomers typically have a number average molecular weight no greater than 450 g/mole include Suitable reactive diluents include for example phenoxy ethyl (meth)acrylate; phenoxy-2-methylethyl (meth)acrylate; phenoxyethoxyethyl (meth)acrylate, 3-hydroxy-2-hydroxypropyl (meth)acrylate; benzyl (meth)acrylate, 4-(1-methyl-1-phenethyl)phenoxyethyl (meth)acrylate; phenylthio ethyl acrylate; 2-naphthylthio ethyl acrylate; 1-naphthylthio ethyl acrylate; 2,4,6-tribromophenoxy ethyl acrylate; 2,4-dibromophenoxy ethyl acrylate; 2-bromophenoxy ethyl acrylate; 1-naphthyloxy ethyl acrylate; 2-naphthyloxy ethyl acrylate; phenoxy 2-methylethyl acrylate; phenoxyethoxyethyl acrylate; 3-phenoxy-2-hydroxy propyl acrylate; 2-phenylphenoxy ethyl acrylate; 4-phenylphenoxy ethyl acrylate; 2,4-dibromo-6-sec-butylphenyl acrylate; 2,4-dibromo-6-isopropylphenyl acrylate; benzyl acrylate; phenyl acrylate; 2,4,6-tribromophenyl acrylate.

Other high refractive index monomers such as pentabromobenzyl acrylate and pentabromophenyl acrylate can also be employed.

The inclusion of only one diluent is preferred for ease in manufacturing. A preferred diluent is phenoxyethyl (meth) acrylate, and in particular phenoxyethyl acrylate (PEA). Phenoxyethyl acrylate is commercially available from more than one source including from Sartomer under the trade designation "SR339"; from Eternal Chemical Co. Ltd. under the trade designation "Etermer 210"; and from Toagosei Co. Ltd under the trade designation "TO-1166". Benzyl acrylate is commercially available from AlfaAeser Corp, Ward Hill, Mass.

Such optional monomer(s) may be present in the polymerizable composition in amount of at least about 5 wt-%. The optional monomer(s) typically total no more than about 50 wt-% of the polymerizable composition. The some embodiments the total amount of optional high index monomer ranges from about 30 wt-% to about 45 wt-% (including integers between 30 and 45).

The optional high index monomer may be halogenated (i.e. brominated). One exemplary high index optional monomer is 2,4,6-tribromophenoxyethyl (meth)acrylate commercially available from Daiichi Kogyo Seiyaku Co. Ltd (Kyoto, Japan) under the trade designation "BR-31".

Suitable methods of polymerization include solution polymerization, suspension polymerization, emulsion polymerization, and bulk polymerization, as are known in the art. Suitable methods include heating in the presence of a free-radical initiator as well as irradiation with electromagnetic radiation such as ultraviolet or visible light in the presence of a photoinitiator. Inhibitors are frequently used in the synthesis of the polymerizable composition to prevent premature polymerization of the resin during synthesis, transportation and storage. Suitable inhibitors include hydroquinone, 4-methoxy phenol, and hindered amine nitroxide inhibitors at levels of 50-1000 ppm. Other kinds and/or amounts of inhibitors may be employed as known to those skilled in the art.

The composition of the present invention optionally comprises a least one photoinitiator. A single photoinitiator or blends thereof may be employed in the brightness enhancement film of the invention. In general the photoinitiator(s) are at least partially soluble (e.g. at the processing temperature of the resin) and substantially colorless after being polymerized. The photoinitiator may be (e.g. yellow) colored, provided that the photoinitiator is rendered substantially colorless after exposure to the UV light source.

Suitable photoinitiators include monoacylphosphine oxide and bisacylphosphine oxide. Commercially available mono or bisacylphosphine oxide photoinitiators include 2,4,6-trimethylbenzoydiphenylphosphine oxide, commercially available from BASF (Charlotte, N.C.) under the trade designation "Lucirin TPO"; ethyl-2,4,6-trimethylbenzoylphenyl phosphinate, also commercially available from BASF under the trade designation "Lucirin TPO-L"; and bis(2,4,6-trimethylbenzoyl)-phenylphosphine oxide commercially available from Ciba Specialty Chemicals under the trade designation "Irgacure 819". Other suitable photoinitiators include 2-hydroxy-2-methyl-1-phenyl-propan-1-one, commercially available from Ciba Specialty Chemicals under the trade designation "Darocur 1173" as well as other photoinitiators commercially available from Ciba Specialty Chemicals under the trade designations "Darocur 4265", "Irgacure 651", "Irgacure 1800", "Irgacure 369", "Irgacure 1700", and "Irgacure 907".

The photoinitiator can be used at a concentration of about 0.1 to about 10 weight percent. More preferably, the photoinitiator is used at a concentration of about 0.5 to about 5 wt-%. Greater than 5 wt-% is generally disadvantageous in view of the tendency to cause yellow discoloration of the brightness enhancing film. Other photoinitiators and photoinitiator may also suitably be employed as may be determined by one of ordinary skill in the art.

Surfactants such as fluorosurfactants and silicone based surfactants can optionally be included in the polymerizable composition to reduce surface tension, improve wetting, allow smoother coating and fewer defects of the coating, etc.

The polymerizable compositions are energy curable in time scales preferably less than five minutes such as for a brightness enhancing film having a 75 micron thickness. The polymerizable composition is preferably sufficiently crosslinked to provide a glass transition temperature that is typically greater than 45° C. The glass transition temperature can be measured by methods known in the art, such as Differential Scanning Calorimetry (DSC), modulated DSC, or Dynamic Mechanical Analysis. The polymerizable composition can be polymerized by conventional free radical polymerization methods.

Although inorganic nanoparticles lacking polymerizable surface modification can usefully be employed, the inorganic nanoparticles are preferably surface modified such that the nanoparticles are polymerizable with the organic component. Surface modified (e.g. colloidal) nanoparticles can be present in the polymerized structure in an amount effective to enhance the durability and/or refractive index of the article or optical element. The surface modified colloidal nanoparticles described herein can have a variety of desirable attributes, including for example; nanoparticle compatibility with resin systems such that the nanoparticles form stable dispersions within the resin systems, surface modification can provide reactivity of the nanoparticle with the resin system making the composite more durable, properly surface modified nanoparticles added to resin systems provide a low impact on uncured composition viscosity. A combination of surface modifiers can be used to manipulate the uncured and cured properties of the composition. Appropriately surface modified nanoparticles can improve the optical and physical properties of the optical element such as, for example, improve resin mechanical strength, minimize viscosity changes while increasing solid volume loading in the resin system and maintain optical clarity while increasing solid volume loading in the resin system.

The surface modified colloidal nanoparticles can be oxide particles having a primary particle size or associated particle size of greater than 1 nm and less than 100 nm. It is preferred that the nanoparticles are unassociated. Their measurements can be based on transmission electron miscroscopy (TEM). The nanoparticles can include metal oxides such as, for example, alumina, tin oxides, antimony oxides, silica, zirconia, titania, mixtures thereof, or mixed oxides thereof. Surface modified colloidal nanoparticles can be substantially fully condensed.

Non-silica containing fully condensed nanoparticles typically have a degree of crystallinity (measured as isolated metal oxide particles) greater than 55%, preferably greater than 60%, and more preferably greater than 70%. For example, the degree of crystallinity can range up to about 86% or greater. The degree of crystallinity can be determined by X-ray detraction techniques. Condensed crystalline (e.g. zirconia) nanoparticles have a high refractive index whereas amorphous nanoparticles typically have a lower refractive index.

Silica nanoparticles can have a particle size from 5 to 75 nm or 10 to 30 nm or 20 nm. Silica nanoparticles can be present in the durable article or optical element in an amount from 10 to 60 wt-%, or 10 to 40 wt-%. Silicas for use in the materials of the invention are commercially available from Nalco Chemical Co., Naperville, Ill. under the trade designation "Nalco Colloidal Silicas" such as products 1040, 1042, 1050, 1060, 2327 and 2329. Suitable fumed silicas include for example, products commercially available from DeGussa A G, (Hanau, Germany) under the trade designation, "Aerosil series OX-50", as well as product numbers -130, -150, and -200. Fumed silicas are also commercially available from Cabot Corp., Tuscola, I, under the trade designations CAB-O-SPERSE 2095", "CAB-O-SPERSE A105", and "CAB-O-SIL M5".

Zirconia nanoparticles can have a particle size from 5 to 50 nm, or 5 to 15 nm, or nm. Zirconia nanoparticles can be present in the durable article or optical element in an amount from 10 to 70 wt-%, or 30 to 60 wt-%. Zirconias for use in composition and articles of the invention are available from Nalco Chemical Co. under the trade designation "Nalco OOSSOO8" and from Buhler AG Uzwil, Switzerland under the trade designation "Buhler zirconia Z-WO sol". Zirconia nanoparticle can also be prepared such as described in U.S. Pat. No. 7,241,437 and U.S. Pat. No. 6,376,590.

Titania, antimony oxides, alumina, tin oxides, and/or mixed metal oxide nanoparticles can have a particle size or associated particle size from 5 to 50 nm, or 5 to 15 nm, or 10 nm. Titania, antimony oxides, alumina, tin oxides, and/or mixed metal oxide nanoparticles can be present in the durable article or optical element in an amount from 10 to 70 wt-%, or 30 to 60 wt-%. Mixed metal oxide for use in materials of the invention are commercially available from Catalysts & Chemical Industries Corp., Kawasaki, Japan, under the trade designation "Optolake 3".

Surface-treating the nano-sized particles can provide a stable dispersion in the polymeric resin. Preferably, the surface-treatment stabilizes the nanoparticles so that the particles will be well dispersed in the polymerizable resin and results in a substantially homogeneous composition. Furthermore, the nanoparticles can be modified over at least a portion of its surface with a surface treatment agent so that the stabilized particle can copolymerize or react with the polymerizable resin during curing.

The nanoparticles of the present invention are preferably treated with a surface treatment agent. In general a surface treatment agent has a first end that will attach to the particle surface (covalently, ionically or through strong physisorption) and a second end that imparts compatibility of the particle with the resin and/or reacts with resin during curing. Examples of surface treatment agents include alcohols, amines, carboxylic acids, sulfonic acids, phosphonic acids, silanes and titanates. The preferred type of treatment agent is determined, in part, by the chemical nature of the metal oxide surface. Silanes are preferred for silica and other for siliceous fillers. Silanes and carboxylic acids are preferred for metal oxides such as zirconia. The surface modification can be done either subsequent to mixing with the monomers or after mixing. It is preferred in the case of silanes to react the silanes with the particle or nanoparticle surface before incorporation into the resin. The required amount of surface modifier is dependant upon several factors such particle size, particle type, modifier molecular wt, and modifier type. In general it is preferred that approximately a monolayer of modifier is attached to the surface of the particle. The attachment procedure or reaction conditions required also depend on the surface modifier used. For silanes it is preferred to surface treat at elevated temperatures under acidic or basic conditions for from 1-24 hr approximately. Surface treatment agents such as carboxylic acids may not require elevated temperatures or extended time.

Representative embodiments of surface treatment agents suitable for the compositions include compounds such as, for example, isooctyl trimethoxy-silane, N-(3-triethoxysilylpropyl)methoxyethoxyethoxyethyl carbamate, N-(3-triethoxysilylpropyl)methoxyethoxyethoxyethyl carbamate, 3-(methacryloyloxy)propyltrimethoxysilane, 3-acryloxypropyltrimethoxysilane, 3-(methacryloyloxy)propyltriethoxysilane, 3-(methacryloyloxy) propylmethyldimethoxysilane, 3-(acryloyloxypropyl)methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate, 2-(2-methoxyethoxy)acetic acid, methoxyphenyl acetic acid, and mixtures thereof. Further, a proprietary silane surface modifier, commercially available from OSI Specialties, Crompton South Charleston, W. Va. under the trade designation "Silquest A1230", has been found particularly suitable.

The surface modification of the particles in the colloidal dispersion can be accomplished in a variety of ways. The process involves the mixture of an inorganic dispersion with surface modifying agents. Optionally, a co-solvent can be added at this point, such as for example, 1-methoxy-2-propanol, ethanol, isopropanol, ethylene glycol, N,N-dimethylacetamide and 1-methyl-2-pyrrolidinone. The co-solvent can enhance the solubility of the surface modifying agents as well as the surface modified particles. The mixture comprising the inorganic sol and surface modifying agents is subsequently reacted at room or an elevated temperature, with or without mixing. In a preferred method, the mixture can be reacted at about 85° C. for about 24 hours, resulting in the surface modified sol. In a preferred method, where metal oxides are surface modified the surface treatment of the metal oxide can preferably involve the adsorption of acidic molecules to the particle surface. The surface modification of the heavy metal oxide may take place at room temperature.

The surface modification of $ZrO_2$ with silanes can be accomplished under acidic conditions or basic conditions. In one preferred case the silanes are preferably heated under acid conditions for a suitable period of time. At which time the dispersion is combined with aqueous ammonia (or other base). This method allows removal of the acid counter ion from the $ZrO_2$ surface as well as reaction with the silane. In a preferred method the particles are precipitated from the dispersion and separated from the liquid phase.

The surface modified particles can then be incorporated into the curable resin in various methods. In a preferred aspect, a solvent exchange procedure is utilized whereby the resin is added to the surface modified sol, followed by removal of the water and co-solvent (if used) via evaporation, thus leaving the particles dispersed in the polymerizable resin. The evaporation step can be accomplished for example, via distillation, rotary evaporation or oven drying.

In another aspect, the surface modified particles can be extracted into a water immiscible solvent followed by solvent exchange, if so desired.

Alternatively, another method for incorporating the surface modified nanoparticles in the polymerizable resin involves the drying of the modified particles into a powder, followed by the addition of the resin material into which the particles are dispersed. The drying step in this method can be accomplished by conventional means suitable for the system, such as, for example, oven drying or spray drying.

A combination of surface modifying agents can be useful, wherein at least one of the agents has a functional group co-polymerizable with a hardenable resin. Combinations of surface modifying agent can result in lower viscosity. For example, the polymerizing group can be ethylenically unsaturated or a cyclic function subject to ring opening polymerization. An ethylenically unsaturated polymerizing group can be, for example, an acrylate or methacrylate, or vinyl group. A cyclic functional group subject to ring opening polymerization generally contains a heteroatom such as oxygen, sulfur or nitrogen, and preferably a 3-membered ring containing oxygen such as an epoxide.

A preferred combination of surface modifying agent includes at least one surface modifying agent having a functional group that is co-polymerizable with the (organic component of the) hardenable resin and a second modifying agent different than the first modifying agent. The second modifying agent is optionally co-polymerizable with the organic component of the polymerizable composition. The second modifying agent may have a low refractive index (i.e. less than 1.52 or less than 1.50). The second modifying agent is preferably a polyalkyleneoxide containing modifying agent that is optionally co-polymerizable with the organic component of the polymerizable composition.

As described in Lu and Lu et al., a microstructure-bearing article (e.g. brightness enhancing film) can be prepared by a method including the steps of (a) preparing a polymerizable composition (i.e. the polymerizable composition of the invention); (b) depositing the polymerizable composition onto a master negative microstructured molding surface in an amount barely sufficient to fill the cavities of the master; (c) filling the cavities by moving a bead of the polymerizable composition between a preformed base and the master, at least one of which is flexible; and (d) curing the composition. The master can be metallic, such as nickel, nickel-plated copper or brass, or can be a thermoplastic material that is stable under the polymerization conditions, and that preferably has a surface energy that allows clean removal of the polymerized material from the master. One or more the surfaces of the base film can be optionally be primed or otherwise be treated to promote adhesion of the optical layer to the base.

Figure 2:
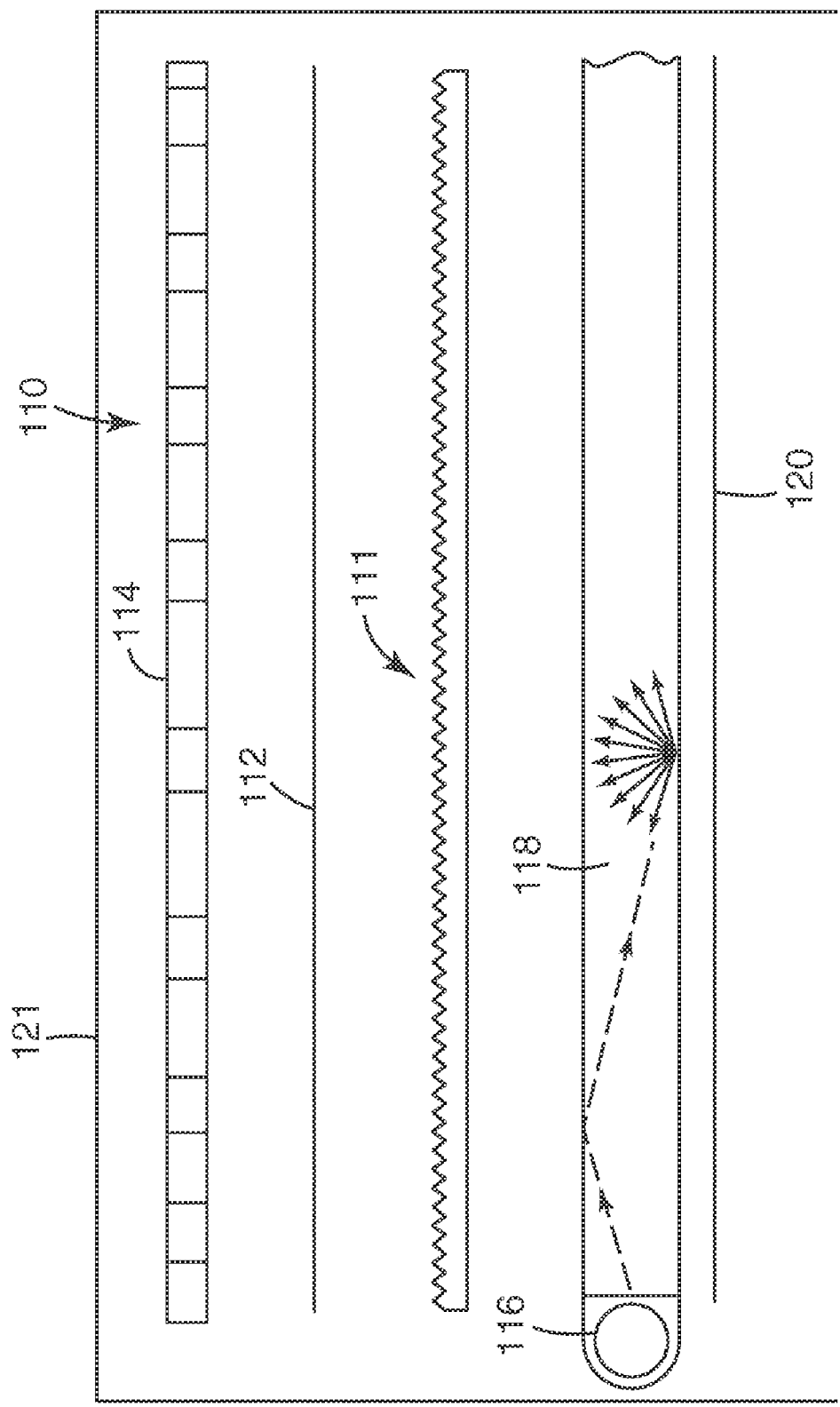
FIG. 2 is a schematic view of an illustrative backlit liquid crystal display including the brightness enhancing film of the invention.

The brightness enhancing film of the invention is usefully employed in a display for the purpose of improving the gain. A schematic view of an illustrative backlit liquid crystal display generally indicated at 110 in FIG. 2. In the actual display, the various components depicted are often in contact with the brightness enhancing film. The brightness enhancing film 111 of the present invention is generally positioned between a light guide 118 and a liquid crystal display panel 114. The liquid crystal display panel typically includes an absorbing polarizer on both surfaces. Thus, such absorbing polarizer is positioned adjacent to the brightness enhancing film of the invention. The backlit liquid crystal display can also include a light source 116 such as a fluorescent lamp and a white reflector 120 also for reflecting light also toward the liquid crystal display panel. The brightness enhancing film 111 collimates light emitted from the light guide 118 thereby increasing the brightness of the liquid crystal display panel 114. The increased brightness enables a sharper image to be produced by the liquid crystal display panel and allows the power of the light source 116 to be reduced to produce a selected brightness. The backlit liquid crystal display is useful in equipment such as computer displays (laptop displays and computer monitors), televisions, video recorders, mobile communication devices, handheld devices (i.e. cell phone, personal digital assistant (PDA)), automobile and avionic instrument displays, and the like, represented by reference character 121.

The display may further include another optical film 112 positioned between the brightness enhancing film and the liquid crystal display panel 114. The other optical film may include for example a diffuser, a reflective polarizer, or a second brightness enhancing film. Other optical films may be positioned between optical film 112 and the liquid crystal display panel 114 or between the brightness enhancing film 111 and the light guide 118, as are known in the art. Further, a turning film may be located between lightguide and optical film. Alternatively, the brightness enhancing film may be a turning film. A turning film typically includes prism structures formed on an input surface, and the input surface is disposed adjacent the lightguide. The light rays exiting the lightguide at the glancing angle, usually less than 30 degrees to the output surface, encounter the prism structures. The light rays are refracted by a first surface of the prism structures and are reflected by a second surface of the prism structures such that they are directed by the turning lens or film in the desired direction, e.g., substantially parallel to a viewing axis of the display.

Examples of polarizing films include those described in U.S. Pat. Nos. 5,825,543 and 5,783,120, each of which are incorporated herein by reference. The use of these polarizer films in combination with a brightness enhancing film has been described in U.S. Pat. No. 6,111,696. Another example of a polarizing film is described in U.S. Pat. No. 5,882,774. One example of such films that are available commercially are the multilayer films sold under the trade designation DBEF (Dual Brightness Enhancement Film) from 3M Company. Multilayer polarizing optical films have been described, for example in U.S. Pat. No. 5,828,488. A turning film typically includes prism structures formed on an input surface and the input surface is disposed adjacent to a lightguide. The light rays exiting the lightguide at the glancing angles, usually less than 30 degrees to the output surfaces, encounter the prism structures. The light rays are refracted by a first surface of the prism structures and are reflected by a second surface of the prism structures such that the rays are directed by the turning film in the desired direction, e.g. substantially parallel to a viewing axis of the display. If these additional optical films are included as the base layer of the brightness enhancing films, than the thickness of the base layer may be considerably greater than previously described.

The polymerizable composition described herein may be advantageous for other optical materials such as microstructure-bearing optical articles (e.g. films). Exemplary optical materials include optical lenses such as Fresnel lenses, optical films, such as high index of refraction films e.g., microreplicated films such as totally internal reflecting films, or brightness enhancing films, flat films, multilayer films, retroreflective sheeting, optical light fibers or tubes, flexible molds (e.g. suitable for making barrier ribs for plasma display panels) and others. The production of optical products from high index of refraction polymerizable compositions is described, for example, in U.S. Pat. No. 4,542,449, the disclosure of which is incorporated herein by reference.

Advantages of the invention are further illustrated by the following examples, but the particular materials and amounts thereof recited in the examples, as well as other conditions and details, should not be construed to unduly limit the invention. All percentages and ratios herein are by weight unless otherwise specified.

EXAMPLES

Test Methods

1. Gain Test Method

Gain, the difference in transmitted light intensity of an optical material compared to a standard material, was measured on a SpectraScan™ PR-650 SpectraColorimeter available from Photo Research, Inc, Chatsworth, Calif. Results of this method for each example formed below are reported in the RESULTS section below. In order to measure the single sheet gain (i.e. "SS") film samples were cut and placed on a Teflon light cube that is illuminated via a light-pipe using a Foster DCR II light source such that the grooves of the prisms are parallel to the front face of the Teflon light cube. For crossed sheet gain (i.e. "XS") a second sheet of the same material is placed underneath the first sheet and orientated such that the grooves of the second sheet are normal to the front face of the Teflon light cube.

In three sets of experiments, polymerizable resin compositions were prepared into brightness enhancing films using a master tool that had a 90° apex angles as defined by the slope of the sides of the prisms. In the first set of experiments, the mean distance between adjacent apices was about 50 micrometers and the apex of the prism vertices was round. In the second set of experiments, the mean distance between adjacent apices was about 50 micrometers and the apex of the prism vertices was sharp. In the third set of experiments, the mean distance between adjacent apices was about 24 micrometers and the apex of the prism vertices was sharp. For Experiment 1 (Control 1, Samples 1-3) and Experiment 3 (Control 3, Sample 5), polymerizable resin compositions were heated to a temperature of about 50° C. and poured onto the master tool in a sufficient volume to create a continuous film. The master tool and polymerizable resin were pulled through a coating bar device to create a thickness of polymerizable resin of approximately 25 microns in the first set of experiments and approximately 13 microns in the third set of experiments. After coating, a PET film was laminated onto polymerizable resin. The master tool, polymerizable resin, and PET film were then placed into UV curing machine and exposed at 3000 millijoules/cm$^2$. After curing, the polymerized resin and PET were peeled from the master tool. Experiment 2 was performed under similar process conditions as described for Experiments 1 & 3, but was conducted in a continuous fashion.

In the first set of experiments brightness enhancing films were prepared from polymerizable resin compositions 1-3 along with a control (i.e. Control 1 of Table I). In a second set of experiments brightness enhancing films were prepared from polymerizable resin composition 4 along with a control (i.e. Control 2 of Table I). In a third set of experiments, brightness enhancing films were prepared from polymerizable resin composition 5 along with a control (i.e. Control 3 of Table I). For each set of experiments the control consisted of a mixture of 12.5 wt-% PEA, 37.5 wt-% BR-31, 30 wt-% RDX-51027, 20 wt-% of a crosslinking agent obtained from UCB Corporation under the trade designation "EB-9220", 1 pph Darocur 1173, and 0.3 wt-% surfactant, commercially available from 3M Company under the trade designation "FC-430".

Table I as follows sets forth the amount of first monomer, kind and amount of monofunctional diluent (i.e. phenoxyethyl acrylate (PEA)), crosslinking agent (i.e. PETA), inorganic nanoparticles, photoinitiator (Lucirin TPO-L) employed in the examples. The first monomer employed in the examples comprised at least about 60-70 wt-% of 2-propenoic acid, (1-methylethylidene)bis[(2,6-dibromo-4,1-phenylene)oxy(2-hydroxy-3,1-propanediyl)]ester.

TABLE I

| Polymerizable Resin Composition | Photo-initiator 1 pph | Wt. % PEA | Wt. % First Monomer | Wt. % PETA | Surface Modifier Wt. % | Other | SS Gain | XS Gain |
|---|---|---|---|---|---|---|---|---|
| Control 1 | | | | | | | 1.666 | |
| Example 1 | TPO-L | 9.7 | 29 | 9.7 | 5.7 | 46 wt. % 20 nm SiO2 | 1.552 | |
| Example 2 | TPO-L | 11.5 | 34.4 | 11.5 | 4.7 | 38 wt. % 20 nm SiO$_2$ | 1.557 | |
| Example 3 | TPO-L | 12.8 | 24.5 | 12.8 | 4 | 32 wt. % 20 nm SiO$_2$ | 1.570 | |
| Control 2 | | | | | | | 1.707 | 2.500 |
| Example 4 | TPO-L | 9.2 | 27.5 | 9.2 | 15 | 39% Nalco zirconia | 1.717 | 2.535 |
| Control 3 | | | | | | | 1.721 | 2.488 |
| Example 5 | TPO-L | 8.6 | 25.7 | 8.6 | 9.1 | 48% Buhler zirconia | 1.838 | 2.496 |
| Example 6 | | | | | | | 1.881 | 2.687 |

* See example for ingredients.

Example 1

Nalco 2327(400 g) was charged to a 1 qt jar. 1-Methoxy-2-propanol (450 g), 3-(trimethoxysilyl)propyl methacrylate commercially available from Sigma-Aldrich, Milwaukee, Wis. under the trade designation "Silane A174" (18.95 g), Silquest A1230 (12.74 g), and a 5% solution in water (0.2 g) of hindered amine nitroxide inhibitor commercially available from Ciba Specialty Chemical, Inc. Tarrytown, N.Y. under the trade designation "Prostab 5198" was prepared and added to a colloidal silica dispersion commercially available from Ondeo-Nalco Co., Naperville, Ill. under the trade designation "Nalco 2327" while stirring. The jar was sealed and heated to 80° C. for 16.5 hours. This resulted in a clear, low viscosity dispersion of modified silica.

A 1 L round-bottom flask (large neck) was charged with the above modified sol (442.23 g), 20/60/20 SR444/First Monomer/PEA (82.25 g) and a 5% solution of Prostab 5198 in water (0.65 g). Water and alcohol were removed via rotary evaporation. The formulation contained 46.04 wt % $SiO_2$ as measured by TGA. Refractive index was 1.512. 1 wt % TPO-L was added.

Example 2

The $SiO_2$ containing resin from Example 1 (10 g) was mixed with 20/60/20 SR444/First Monomer/PEA (2.12 g) to give a 38 wt-% $SiO_2$ containing resin. 1 wt-% TPO-L was added.

Example 3

The $SiO_2$ containing resin from Example 1 (10 g) was mixed with 20/60/20 SR444/First Monomer/PEA (4.38 g) to give a 32 wt-% $SiO_2$ containing resin. 1 wt % TPO-L was added.

Example 4

Preparation of silane-modified zirconia nanoparticle dispersion: Nalco OOSSOO8 zirconia sol (372.56 g) and 2-[2-(2-methoxyethoxy)ethoxy]acetic acid (MEEAA) commercially available from Sigma-Aldrich (23.16 g) were charged to a 1 L round bottom flask. The water and acetic acid were removed via rotary evaporation. The powder thus obtained was redispersed in 127.58 g D.I water and charged to a 2 L beaker to which was added with stirring 400 g 1-methoxy-2-propanol, 36.62 g A-174, 24.61 g Silquest A-1230 and 0.4 g of a 5% solution of Prostab 5198 in water. This mixture was stirred 30 min at room temperature then poured into IL (quart) jars, sealed and heated to 90° C. for 3.0 h. The contents of the jars were removed and concentrated to 40% $ZrO_2$ via rotary evaporation. Deionized water (1565 g) and 51 g concentrated aqueous ammonia (29% $NH_3$) were charged to a 4 L beaker. The concentrated dispersion (295 g) was added slowly to the beaker with stirring. The white precipitate thus obtained was isolated via vacuum filtration and washed with additional D.I. water. The damp solids were dispersed in 1-methoxy-2-propanol (370 g). The resultant silane modified zirconia dispersion contained 20.2% solids.

The above modified $ZrO_2$ dispersion (540 g), 20/60/20 PEA/First Monomer/SR444 (90.4 g) and a 5% solution of Prostab 5198 in water (0.72 g) were charged to a 1 L round bottom flask. Water and alcohol were removed via rotary evaporation. The resultant formulation contained 38.60% $ZrO_2$ by TGA and had a refractive index of 1.587.

Example 5

Preparation of Silane-Modified Zirconia Nanoparticle Dispersion: Buhler Zirconia Z-WO sol (401.5 g) (available from Buhler AG Uzwil, Switzerland) was charged to a 1 qt jar to which was added with stirring, 450 g 1-methoxy-2-propanol, 28.5 g Silane A174, 19.16 g Silquest A-1230 and 0.5 g of a 5% solution of Prostab 5198 in water. This mixture was stirred 30 min at room temperature then sealed and heated to 90° C. for 3.0 h. The contents of the jars were removed and concentrated to approximately 40% $ZrO_2$ via rotary evaporation. Deionized water (707.8 g) and 24.2 g concentrated aqueous ammonia (29% $NH_3$) were charged to a 4 L beaker. The concentrated dispersion (346.8 g) was added slowly to the beaker with stirring. The white precipitate thus obtained was isolated via vacuum filtration and washed with additional D.I. water. The damp solids were dispersed in 1-methoxy-2-propanol. The resultant silane modified zirconia dispersion contained 20.58% solids.

The above modified $ZrO_2$ dispersion (225.2 g), 20/60/20 PEA/First Monomer/SR444 (30.9 g) and a 5% solution of Prostab 5198 in water (0.24 g) were charged to a 1 L round bottom flask. Water and alcohol were removed via rotary evaporation. The resultant formulation contained 47.85% $ZrO_2$ by TGA and had a refractive index of 1.615. 1 wt % TPO-L was added.

Example 6

A $ZrO_2$ sol was prepared according to U.S. patent application Ser. No. 11/027,426 filed Dec. 30, 2004 yielding a sol with 45.78% solids. The $ZrO_2$ was tested according to the following ZrO2 Test Methods:

Photon Correlation Spectroscopy (PCS)

The volume-average particle size was determined by Photon Correlation Spectroscopy (PCS) using a Malvern Series 4700 particle size analyzer (available from Malvern Instruments Inc., Southborough, Mass.). Dilute zirconia sol samples were filtered through a 0.2 μm filter using syringe-applied pressure into a glass cuvette that was then covered. Prior to starting data acquisition the temperature of the sample chamber was allowed to equilibrate at 25° C. The supplied software was used to do a CONTIN analysis with an angle of 90 degrees. CONTIN is a widely used mathematical method for analyzing general inverse transformation problems that is further described in S. W. Provencher, *Comput. Phys. Commun.* 27, 229 (1982). The analysis was performed using 24 data bins. The following values were used in the calculations: refractive index of water equal to 1.333, viscosity of water equal to 0.890 centipoise, and refractive index of the zirconia particles equal to 1.9.

Two particle size measurements were calculated based on the PCS data. The intensity-average particle size, reported in nanometers, was equal to the size of a particle corresponding to the mean value of the scattered light intensity distribution. The scattered light intensity was proportional to the sixth power of the particle diameter. The volume-average particle size, also reported in nanometers, was derived from a volume distribution that was calculated from the scattered light intensity distribution taking into account both the refractive index of the zirconia particles and the refractive index of the dispersing medium (i.e., water). The volume-average particle size was equal to the particle size corresponding to the mean of the volume distribution.

The intensity-average particle size was divided by the volume-average particle size to provide a ratio that is indicative of the particle size distribution.

Crystalline Structure and Size (XRD Analysis)

The particle size of a dried zirconia sample was reduced by hand grinding using an agate mortar and pestle. A liberal amount of the sample was applied by spatula to a glass microscope slide on which a section of double coated tape had been adhered. The sample was pressed into the adhesive on the tape by forcing the sample against the tape with the spatula blade. Excess sample was removed by scraping the sample area with the edge of the spatula blade, leaving a thin layer of particles adhered to the adhesive. Loosely adhered materials remaining after the scraping were remove by forcefully tapping the microscope slide against a hard surface. In a similar manner, corundum (Linde 1.0 μm alumina polishing powder, Lot Number C062, Union Carbide, Indianapolis, Ind.) was prepared and used to calibrate the diffractometer for instrumental broadening.

X-ray diffraction scans were obtained using a Philips vertical diffractometer having a reflection geometry, copper $K_\alpha$ radiation, and proportional detector registry of the scattered radiation. The diffractometer was fitted with variable incident beam slits, fixed diffracted beam slits, and graphite diffracted beam monochromator. The survey scan was conducted from 25 to 55 degrees two theta (2θ) using a 0.04 degree step size and 8 second dwell time. X-ray generator settings of 45 kV and 35 mA were employed. Data collections for the corundum standard were conducted on three separate areas of several individual corundum mounts. Data was collected on three separate areas of the thin layer sample mount.

The observed diffraction peaks were identified by comparison to the reference diffraction patterns contained within the International Center for Diffraction Data (ICDD) powder diffraction database (sets 1-47, ICDD, Newton Square, Pa.) and attributed to either cubic/tetragonal (C/T) or monoclinic (M) forms of zirconia. The (111) peak for the cubic phase and (101) peak for the tetragonal phase could not be separated so these phases were reported together. The amounts of each zirconia form were evaluated on a relative basis and the form of zirconia having the most intense diffraction peak was assigned the relative intensity value of 100. The strongest line of the remaining crystalline zirconia form was scaled relative to the most intense line and given a value between 1 and 100.

Peak widths for the observed diffraction maxima due to corundum were measured by profile fitting. The relationship between mean corundum peak widths and corundum peak position (2θ) was determined by fitting a polynomial to these data to produce a continuous function used to evaluate the instrumental breadth at any peak position within the corundum testing range. Peak widths for the observed diffraction maxima due to zirconia were measured by profile fitting observed diffraction peaks. The following peak widths were evaluated depending on the zirconia phase found to be present:

Cubic/Tetragonal (C/T): (111)

Monoclinic (M): (-111), and (111)

A Pearson VII peak shape model with $K_{\alpha 1}$ and $K_{\alpha 2}$ wavelength components accounted for, and linear background model were employed in all cases. Widths were found as the peak full width at half maximum (FWHM) having units of degrees. The profile fitting was accomplished by use of the capabilities of the JADE diffraction software suite. Sample peak widths were evaluated for the three separate data collections obtained for the same thin layer sample mount.

Sample peaks were corrected for instrumental broadening by interpolation of instrumental breadth values from corundum instrument calibration and corrected peak widths converted to units of radians. The Scherrer equation was used to calculate the primary crystal size.

$$\text{Crystallite Size}(D) = K\lambda/\beta(\cos \theta)$$

In the Scherrer equation,

K=form factor (here 0.9);

λ=wavelength (1.540598 Å);

β=calculated peak width after correction for instrumental broadening (in radians)=[calculated peak FWHM−instrumental breadth] (converted to radians) where FWHM is full width at half maximum; and θ=½ the peak position (scattering angle).

The cubic/tetragonal crystallite size was measured as the average of three measurements using (111) peak.

Cubic/Tetragonal Mean Crystallite Size=
$[D(111)_{area\,1}+D(111)_{area\,2}+D(111)_{area\,3}]/3$ The monoclinic crystallite size was measured as the average of three measurement using the (-111) peak and three measurements using the (111) peak.

Monoclinic Mean Crystallite Size=$[D(-111)_{area\,1}+D(-111)_{area\,2}+D(-111)_{area\,3}+D(111)_{area\,1}+D(111)_{area\,2}+D(111)_{area\,3}]/6$ The weighted average of the cubic/tetragonal (C/T) and monoclininc phases (M) were calculated.

Weighted average=[(% C/T)(C/T size)+(% M)(M size)]/100

In this equation,

% C/T=the percent crystallinity contributed by the cubic and tetragonal crystallite content of the $ZrO_2$ particles;

C/T size=the size of the cubic and tetragonal crystallites;

% M=the percent crystallinity contributed by the monoclinic crystallite content of the $ZrO_2$ particles; and M size=the size of the monoclinic crystallites.

Dispersion Index

The Dispersion Index is equal to the volume-average size measured by PCS divided by the weighted average crystallite size measured by XRD.

Weight Percent Solids

The weight percent solids were determined by drying a sample weighing 3 to 6 grams at 120° C. for 30 minutes. The percent solids can be calculated from the weight of the wet sample (i.e., weight before drying, weight$_{wet}$) and the weight of the dry sample (i.e., weight after drying, weight$_{dry}$) using the following equation.

wt-% solids=100(weight$_{dry}$)/weight$_{wet}$

The results were as follows:

| | Intensity-average Size (nm) | Volume-average Size (nm) | Intensity-average: Volume-average Ratio |
|---|---|---|---|
| ZrO2 Sol | 42.1 | 17.5 | 2.41 |

| | M Intensity | M Size (nm) | C/T Intensity | C/T Size (nm) | % C/T | XRD Average Size (nm) | Dispersion Index |
|---|---|---|---|---|---|---|---|
| ZrO2 Sol | 9 | 6.5 | 100 | 8.0 | 92 | 7.9 | 2.21 |

The $ZrO_2$ Sol (50.00 g), MEEAA (2.22 g), BCEA (1.06 g), 1-methoxy-2-propanol (75 g), and a 50/50 mix of PEA/RDX (17.60 g) were charged to a round bottom flask and the alcohol and water were removed via rotary evaporation. The $ZrO_2$ containing resin was 49.59% $ZrO_2$ and had a refractive index of 1.639. 0.5 pph of TPO-L was added to the above mixture.

This was prepared into a brightness enhancing film according to Experiment 2 with the exception that the prisms varied in height along their length similar to that of a brightness enhancing film sold by 3M Company under the trade designation "Vikuiti BEF III 90/50 Film". The results are reported in Table I.

The recitation of numerical ranges by endpoint includes all numbers subsumed within that range (e.g. 1 to 5 includes 1. 1.5, 2, 2.75, 3, 3.80, 4 and 5). The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A brightness enhancing film having a microstructured optical layer comprising the reaction product of a polymerizable resin composition comprising:
   a) one or more first monomers selected from the group consisting of:
      i) a monomer comprising a major portion having the structure

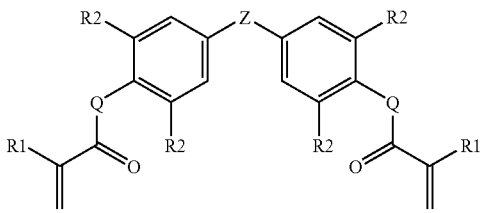

wherein R1 is independently hydrogen or methyl,
      R2 is hydrogen,
      Q is 0, and
      Z is independently —C(CH$_3$)$_2$—, —CH$_2$—, or —C(O)—;
      ii) a monomer comprising a major portion having the structure

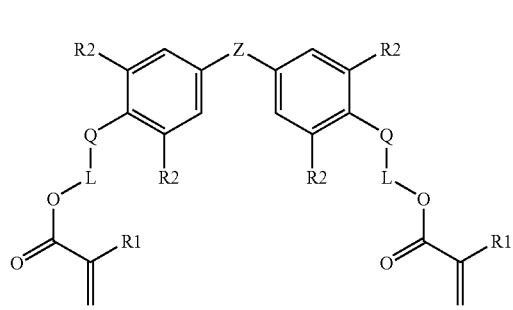

(II)

wherein R1 is independently hydrogen or methyl,
      R2 is hydrogen,
      Q is 0,
      Z is independently —C(CH$_3$)$_2$—, —CH$_2$—, or —C(O)—, and
      L is a linking group independently selected from linear or branched C$_2$-C$_8$ alkyl groups wherein the carbon chain is substituted with one or more oxygen groups, one or more hydroxyl groups, or a combination thereof;
   and mixtures of i and ii;
   b) at least about 10 wt-% of surface modified colloidal inorganic nanoparticles;
   c) up to 35 wt-% of a reactive diluent; and
   d) optionally a crosslinking agent.

2. The brightness enhancing film of claim 1 wherein the amount of inorganic particles is 30 wt-% to 60 wt-%.

3. The brightness enhancing film of claim 1 wherein the inorganic nanoparticles comprise zirconia, titania, antimony oxides, alumina, tin oxides, mixed metal oxides thereof, or mixtures thereof.

4. The brightness enhancing film of claim 1 wherein the primary particle ranges in size from 5 nm to 75 nm.

5. The brightness enhancing film of claim 1 wherein the inorganic nanoparticles comprise zirconia.

6. The brightness enhancing film of claim 1 wherein the inorganic nanoparticles comprise zirconia nanoparticles and silica nanoparticles.

7. The brightness enhancing film of claim 1 wherein the inorganic nanoparticles comprises a surface treatment agent selected from the group consisting of alcohols, amines, carboxylic acid, sulfonic acids, phosphonic acids, silanes, titanates, and mixtures thereof.

8. The brightness enhancing film of claim 1 wherein the inorganic nanoparticles comprise silica nanoparticles comprising a silane surface treatment.

9. The brightness enhancing film of claim 1 wherein the inorganic nanoparticles comprise zirconia nanoparticles having a carboxylic acid surface treatment.

10. The brightness enhancing film of claim 1 wherein the crosslinking agent is selected from the group consisting of hexanediol diacrylate, pentaerythritol tri(meth)acrylate, pentaerythritol tetra(meth)acrylate, trimethylolpropane tri(meth)acrylate, ditrimethylolpropane tetra(meth)acrylate, dipentaerythritol penta(meth)acrylate, hexanediol diacrylate, and mixtures thereof.

11. The brightness enhancing film of claim 1 wherein the reactive diluent is a mono functional ethylenically unsaturated diluent.

12. The brightness enhancing film of claim 11 wherein the diluent is a liquid at room temperature.

13. The brightness enhancing film of claim 11 wherein the diluent is non-halogenated.

14. The brightness enhancing film of claim 11 wherein the diluent has a refractive index of greater than 1.50.

15. The brightness enhancing film of claim 11 wherein the diluent has a refractive index of greater than 1.55.

16. The brightness enhancing film of claim 11 wherein the diluent comprises phenoxyethyl (meth)acrylate, benzyl (meth)acrylate, 2-phenylphenoxy ethyl acrylate, 4-phenylphenoxy ethyl acrylate 17. The brightness enhancing film of claim 11 wherein the diluent is present in an amount up to about 35 wt-% of the polymerizable resin composition.

18. The brightness enhancing film of claim 1 wherein the film further comprises a base layer comprising polyester optically coupled to the microstructured optical layer.

19. The brightness enhancing film of claim 1 wherein the film further comprises a base layer comprising polycarbonate optically coupled to the polymerized structure.

20. The brightness enhancing film of claim 19 wherein the polymerizable resin composition comprises a reactive diluent comprising N-substituted or N,N-disubstituted (meth)acrylamides, N-vinyl pyrrolidone, and N-vinyl caprolactam.

21. The brightness enhancing film of claim 1 wherein the polymerizable resin composition comprises at least 15 wt-% of the first monomer.

22. A substantially solvent free polymerizable resin composition comprising
   a) at least about 15 wt-% of one or more first monomers selected from the group consisting of:
      i) a monomer comprising a major portion having the structure

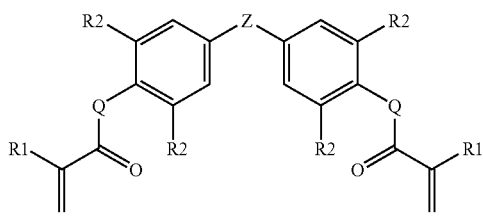

wherein R1 is independently hydrogen or methyl,
R2 is hydrogen,
Q is 0 or, and
Z is independently —C(CH$_3$)$_2$—, —CH$_2$—, or —C(O)—;
ii) a monomer comprising a major portion having the structure (II)

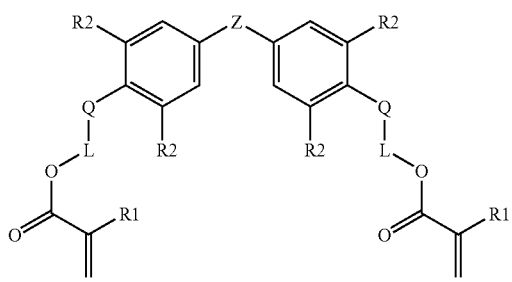

and mixtures of i and ii;
wherein R1 is independently hydrogen or methyl,
R2 is hydrogen,
Q is 0,
Z is independently —C(CH$_3$)$_2$—, —CH$_2$—, or —C(O)—, and
L is a linking group independently selected from linear or branched C$_2$-C$_8$ alkyl groups wherein the carbon chain is substituted with one or more oxygen groups, one or more hydroxyl groups, or a combination thereof;
b) at least about 10 wt-% of surface modified colloidal inorganic nanoparticles;
c) up to 35 wt-% of a non-brominated reactive diluent;
d) optionally a crosslinking agent; and
e) a photoinitiator.

23. A brightness enhancing film comprising:
a brightness enhancing microstructured optical layer comprising the reaction product of a substantially solvent free polymerizable composition comprising an organic component comprising at least one monofunctional and at least one difunctional ethylenically unsaturated monomers wherein the organic component has a viscosity of less than 1000 cps at 180° F.; and
at least 10 wt-% of surface modified inorganic nanoparticles.

24. A brightness enhancing film comprising:
a brightness enhancing microstructured optical layer comprising the reaction product of a substantially solvent free polymerizable composition comprises an organic component comprising at least one difunctional ethylenically unsaturated monomers and a non-brominated reactive diluent wherein the organic component has a refractive index of at least 1.54; and
at least 10 wt-% surface modified inorganic nanoparticles.

25. The polymerizable resin composition of claim 22 wherein the reactive diluent is non-halogenated.

26. The brightness enhancing film of claim 24 wherein the reactive diluent is non-halogenated.

27. The brightness enhancing film of claim 1 wherein the optical layer comprises a linear array of regular right prisms having apexes that are sharp, rounded, flattened, or truncated.

28. The brightness enhancing film of claim 23 wherein the optical layer comprises a linear array of regular right prisms having apexes that are sharp, rounded, flattened, or truncated.

29. The brightness enhancing film of claim 24 wherein the optical layer comprises a linear array of regular right prisms having apexes that are sharp, rounded, flattened, or truncated.

30. The brightness enhancing film of claim 1 further comprising a diffuser is contact with the brightness enhancing film.

31. The brightness enhancing film of claim 23 further comprising a diffuser is contact with the brightness enhancing film.

32. The brightness enhancing film of claim 24 further comprising a diffuser is contact with the brightness enhancing film.

33. A brightness enhancing film comprising:
a brightness enhancing microstructured optical layer comprising the reaction product of a substantially solvent free polymerizable composition having a refractive index of at least 1.54 comprising a reactive diluent and at least 10 wt-% of surface modified inorganic nanoparticles.

* * * * *

UNITED STATES PATENT AND TRADEMARK OFFICE
CERTIFICATE OF CORRECTION

PATENT NO. : 7,547,476 B2
APPLICATION NO. : 11/871330
DATED : June 16, 2009
INVENTOR(S) : Clinton L. Jones It is certified that error appears in the above-identified patent and that said Letters Patent is hereby corrected as shown below:

Title Page
Column 2, U.S. Patent Documents, Delete "O'Neil et al." and insert -- O'Neill et al. --, therefor.
Column 2, Abstract, Delete "nanopartilces" and insert -- nanoparticles --, therefor.

Title Page 2
Column 2, Foreign Patent Documents, Delete "WO 98/90340" and insert -- WO 98/50340 --, therefor.

Column 3
Line 64, Delete "my" and insert -- may --, therefor.

Column 7
Line 63, Delete "acrylate" and insert -- diacrylate --, therefor.

Column 9
Line 59, Delete "crossliker." and insert -- crosslinker. --, therefor.

Column 10
Line 38, Delete "1.55." and insert -- 1.55). --, therefor.
Line 41, Delete "include" and insert -- "." --, therefor.

Column 12
Line 40, Delete "miscroscopy" and insert -- microscopy --, therefor.
Line 52, Delete "detraction" and insert -- diffraction --, therefor.
Line 62, Delete "Collodial" and insert -- Colloidal --, therefor.
Line 64-65, Delete "A G," and insert -- AG, --, therefor.

Column 13
Line 5, Delete "nm." and insert -- 10 nm. --, therefor.

Column 18
Line 6, Delete "SiO2" and insert -- $SiO_2$ --, therefor. (in table 1)

Column 19
Line 31, Delete "IL" and insert -- 1L --, therefor.

UNITED STATES PATENT AND TRADEMARK OFFICE
CERTIFICATE OF CORRECTION

PATENT NO. : 7,547,476 B2 Page 2 of 3
APPLICATION NO. : 11/871330
DATED : June 16, 2009
INVENTOR(S) : Clinton L. Jones It is certified that error appears in the above-identified patent and that said Letters Patent is hereby corrected as shown below:

Column 20
Line 14, Delete "ZrO2" and insert -- $ZrO_2$ --, therefor.

Column 22
Line 9, Delete "monoclininc" and insert -- monoclinic --, therefor.
Line 41, Delete "ZrO2" and insert -- $ZrO_2$ --, therefor.
Line 47, Delete "ZrO2" and insert -- $ZrO_2$ --, therefor.

Column 23
Line 19, In Claim 1, after " 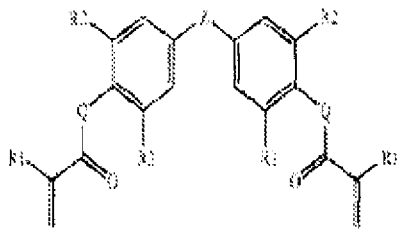 " insert -- (I) --.

Column 23
Line 30, In Claim 1, Delete "0," and insert -- O, --, therefor.
Line 53, In Claim 1, Delete "0," and insert -- O, --, therefor.

Column 24
Line 31, In Claim 11, Delete "mono functional" and insert -- monofunctional --, therefor.

Column 25
Line 2, In Claim 22, after " 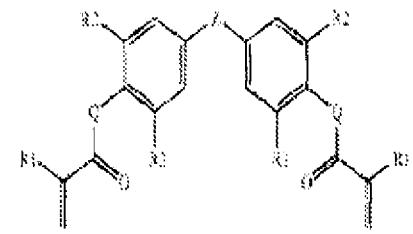 " insert -- (I) --.

UNITED STATES PATENT AND TRADEMARK OFFICE
CERTIFICATE OF CORRECTION

PATENT NO. : 7,547,476 B2
APPLICATION NO. : 11/871330
DATED : June 16, 2009
INVENTOR(S) : Clinton L. Jones It is certified that error appears in the above-identified patent and that said Letters Patent is hereby corrected as shown below:

Line 14, In Claim 22, Delete "0 or," and insert -- O or S, --, therefor.
Line 37, In Claim 22, Delete "0," and insert -- O, --, therefor.

Signed and Sealed this

Thirteenth Day of October, 2009

David J. Kappos
*Director of the United States Patent and Trademark Office*